Patented Dec. 2, 1924.

1,517,516

UNITED STATES PATENT OFFICE.

STEWART JOSEPH LLOYD, OF UNIVERSITY, AND ABSALOM MASON KENNEDY, OF MONTGOMERY, ALABAMA.

METHOD OF MAKING ARSENICAL SALTS.

No Drawing.   Application filed May 22, 1923. Serial No. 640,786.

*To all whom it may concern:*

Be it known that we, STEWART J. LLOYD and ABSALOM M. KENNEDY, citizens of the United States, and residents, respectively, of University, in the county of Tuscaloosa and State of Alabama, and of Montgomery, in the county of Montgomery and State of Alabama, have invented a new and Improved Method of Making Arsenical Salts, of which the following is a full, clear, and exact description.

This invention relates to the manufacture of arsenical salts and especially to the arsenates of calcium and of lead used as insecticides and has for its object the oxidation of a soluble arsenite (as sodium arsenite) to the corresponding arsenate (as sodium arsenate) from which insoluble arsenates of other bases may be prepared.

It is well known in the art that the principal arsenic compound of commerce, that is the form in which arsenic can be the most readily and cheaply procured, is arsenic trioxide ($As_2O_3$) also known as white arsenic or arsenious acid and that this oxide forms the basis from which the other salts of arsenic are produced. It is also known that arsenic trioxide may be oxidized to arsenic pentoxide ($As_2O_5$), as by means of nitric acid or of chlorine, and that under suitable conditions the salts of arsenious acid called arsenites may be oxidized to the corresponding salts of arsenic acid called arsenates, and that the latter salts of certain bases, such as calcium arsenate and lead arsenate form the more valuable insecticides because they are less soluble in water and therefore less liable to injure or " burn " the foliage to which they are applied. In this invention, therefore, a further object is to convert arsenic trioxide into a soluble arsenate from which the usual commercial insecticides as calcium arsenate or lead arsenate may be produced.

To accomplish this we make a soluble arsenite solution by dissolving arsenic trioxide in a solution of a salt of an alkali metal such as sodium carbonate or hydroxide and as the most valuable insecticides usually contain as high proportion of the base element as possible, we prefer to use the hydroxide. We have found it desirable to mix the ingredients in such proportion that the solution is neutral or slightly basic as by mixing 198 parts, by weight, of $As_2O_3$ with from 240 to 250 parts of NaOH.

This solution is then made the electrolyte in an electrolytic cell having insoluble electrodes of any convenient material such as of iron.

When used without a diaphragm between the electrodes, that is a single solution cell, with tri-sodium arsenite as an electrolyte, we have found that the passage of the electric current oxidizes this solution to the arsenate form ($Na_3AsO_4$) at the anode with a high efficiency. At the cathode, hydrogen is given off and we have found that a small amount of metallic arsenic is reduced from the solution, appearing in the solution as small, black particles.

With a diaphragm between the electrodes, using a solution of tri-sodium arsenite in the anode compartment and a solution of sodium hydroxide in the cathode compartment, the reduction of metallic arsenic is prevented. The electrical efficiency of this cell is however less than that of the single solution cell.

The soluble arsenate solution thus produced is filtered to remove any metallic arsenic and is converted into the insoluble insecticides of commerce in the usual manner, that is by adding the arsenate solution to a solution or a suspension containing the desired base element and filtering, washing, drying and pulverizing the resultant precipitate. For example, if calcium arsenate is desired, the soluble arsenate solution, after filtering, is added to a solution of a soluble calcium salt as the chloride or to a suspension of a less soluble calcium salt as the hydroxide in such proportion as will produce the desired insecticide. If calcium hydroxide is used, the mixture will separate into a precipitate of calcium arsenate and a solution of sodium hydroxide which may be separated by filtration, the solution being utilized to prepare fresh sodium arsenite solution by the addition of $As_2O_3$ and the filtrate washed, dried and pulverized.

While sodium arsenite has been taken as an example of a salt which may be used in this process, it will be understood that other soluble arsenites may be used without departing from the spirit of this invention.

Having thus described our invention, what we claim is:

1. The method of making arsenical salts which consists in the oxidation of an arsenite to the arsenate form by electrolysis.

2. The method of making arsenical salts which consists in the oxidation of a soluble arsenite to the arsenate form by electrolysis.

3. The method of making arsenical salts which consists in the production of an alkali metal arsenite solution and the oxidation of this to an arsenate by electrolysis.

4. The method of making arsenical salts, which consists in dissolving arsenic trioxide in the solution of an alkali metal salt, and the oxidation of the resulting solution to an arsenate by electrolysis.

5. The method of making arsenical salts which consists in dissolving arsenic trioxide in the solution of an alkali metal hydroxide and the oxidation of the resulting solution to an arsenate by electrolysis.

6. The method of making arsenical salts which consists in dissolving arsenic trioxide in a solution of sodium hydroxide and the oxidation of the resulting sodium arsenite to sodium arsenate by electrolysis.

7. The method of making arsenical salts which consists in the oxidation of a soluble arsenite to the arsenate form by oxidation in an electrolytic bath and the preparation of an insoluble arsenate by the mixing of this solution with a solution or a suspension of the salt of a base producing such insoluble arsenate.

8. The method of making arsenical salts which consists in the oxidation of a soluble arsenite to the arsenate form by oxidation in an electrolytic bath and the preparation of an insoluble arsenate by the mixing of this solution with a solution or a suspension of the salt of a base producing such insoluble arsenate, the separation of the resulting precipitate from the solution and the utilization of this solution.

9. The method of making arsenical salts which consists in the oxidation of a soluble arsenite to the arsenate form by electrolysis, the arsenite solution being made the anolyte.

10. The method of making calcium arsenate which consists in the production of a solution of sodium arsenite by dissolving arsenic trioxide in a solution of sodium hydroxide, the oxidation of this solution to sodium arsenate by electrolysis and the mixing of this solution with the solution or suspension of a suitable calcium salt.

11. The method of making calcium arsenate which consists in the production of a solution of sodium arsenite by dissolving arsenic trioxide in a solution of sodium hydroxide, the conversion of this into sodium arsenate by electrolytic oxidation, the mixing of this solution with a solution or a suspension of a calcium salt in suitable proportions to form the desired insecticide, the separation of the precipitate of calcium arsenate from the solution of sodium hydroxide and the utilization of this solution in the preparation of new sodium arsenite solution whereby the process may be continued.

STEWART JOSEPH LLOYD.
ABSALOM MASON KENNEDY.